Sept. 25, 1923.  LE ROY B. FRASER  1,468,780
COMBINED REEL, BALANCE WEIGHT, AND ANCHOR FOR DECOYS
Filed Nov. 13, 1922
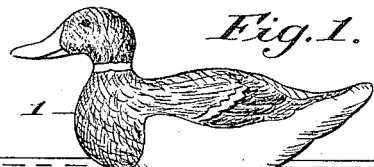
Fig. 1.
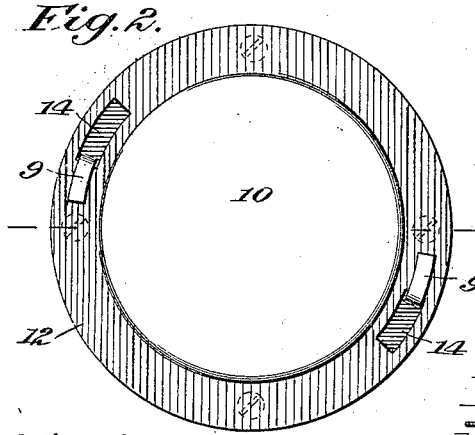
Fig. 2.
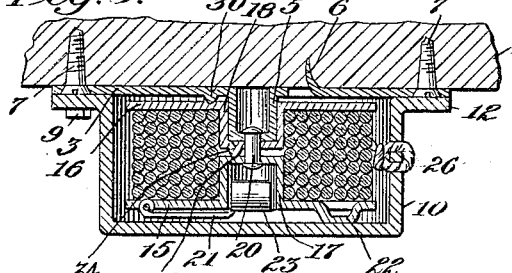
Fig. 3.
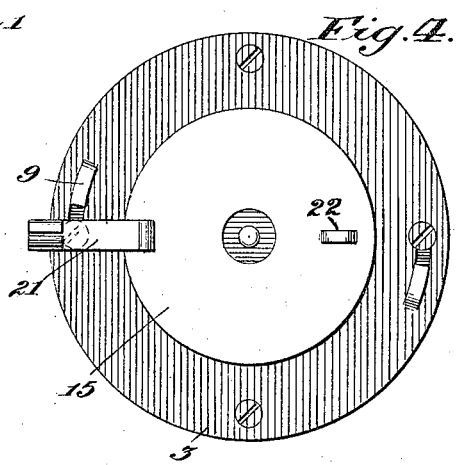
Fig. 4.
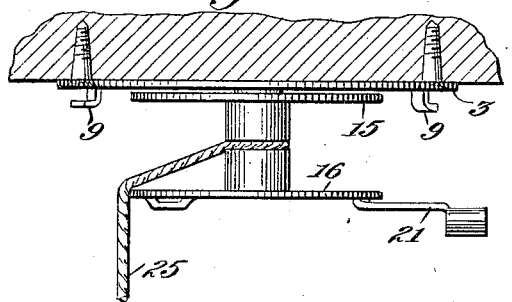
Fig. 5.
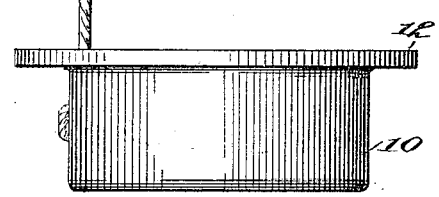
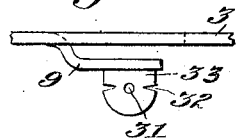
Fig. 3ᵃ.
Inventor:
LeRoy B. Fraser,
by C. A. Mason
Atty.

Patented Sept. 25, 1923.

1,468,780

UNITED STATES PATENT OFFICE.

LE ROY B. FRASER, OF TOLEDO, OHIO.

COMBINED REEL, BALANCE WEIGHT, AND ANCHOR FOR DECOYS.

Application filed November 13, 1922. Serial No. 600,770.

*To all whom it may concern:*

Be it known that I, LE ROY B. FRASER, citizen of the United States of America, residing at Toledo, in the county of Lucas and State of Ohio, have invented certain new and useful Improvements in Combined Reels, Balance Weights, and Anchors for Decoys, of which the following is a full, clear, and exact description.

This invention has relation to attachments for decoys such as decoy ducks, and in particular to a combination unit comprising a reel, a balance weight and anchor for decoys.

An important feature of the invention consists in a device of the class referred to having a reel upon which the cord which extends from a floating decoy to an anchor is wound, and a combined cover and anchor for said reel. With this construction the cover is normally in position to close and protect the reel and the cord wound thereon, and is also in position to be readily detached from the reel and to serve the purposes of an anchor.

Other features of the invention, such as important combinations of parts and details of construction, will be apparent from the following description in connection with the accompanying drawings, and the novel elements of the invention will be pointed out in the appended claims.

In the drawings:

Fig. 1 represents a decoy duck with a device embodying the invention applied thereto;

Fig. 2 is an enlarged inverted plan view showing the cover in position;

Fig. 3 is a vertical section illustrating the device and a portion of the decoy to which it is attached;

Fig. 3ª is a detail illustrating a cord holding device.

Fig. 4 is an inverted plan view showing the reel, minus the cover, and

Fig. 5 is a side elevation illustrating the reel with the combined cover and weight attached to a partly unwound cord.

Referring to Fig. 1, the decoy 1 is illustrated with the reel of the present invention attached and an unwound cord extending to the combined cover and anchor. The hub plate 3, preferably circular in form, as shown in Fig. 4 is provided with an upwardly projecting hub 5, and may also have a downwardly projecting spur 6 so that said plate, with the reel and cover attached may be temporarily attached to the decoy 1 by driving the spur into the decoy. Such temporary attachment is for the purpose of locating the reel, cover and hub plate in the proper position to balance the decoy, and the temporary attachment provides for experimentally locating the device, prior to its permanent attachment.

The hub plate is provided with a plurality of holes through which screws 7 may pass for securing the device permanently to the underside of the decoy. The outer portion of the hub plate near its edge is preferably provided with a series of upstanding tongues 9, extending in opposite directions about the edge of the hub plate. The combined cover and anchor 10 is provided with a flange 12 which extends at right angles to the body portion of the cover and is provided with slots 14 for fitting over the tongues 9, the cover being rotated to cause the tongues to pass beyond the slots 14 and engage the lower surface of the flange thereby locking the cover to the hub plate. By reversely rotating the cover, the tongues will pass into the openings 14 and the cover may then be removed from the hub plate. The reel is composed of two circular plates 15, 16, having inwardly projecting hubs 17, 18, the latter being preferably provided with a spur 35 which frictionally engages the former of said hubs for preventing relative rotation of the plates 15 and 16, and a double headed rivet 20 passes through aligned openings in the hub 5 of the hub plate and the bottoms of the hubs 17, 18 of the reel to rotatably fasten the reel to the hub plate. The reel may be rotated either by a folding handle 21 of the character which is frequently used in tape reels, or by projecting parts 22 which are struck up from the metal of the plate 15 of the reel. The folding handle preferably is provided with an enlarged finger grasping piece 23, which, when the handle is folded inwardly on the reel is housed within the hub 17, as shown in Fig. 3.

A cord 25 is wound upon the reel and its free end is suitably secured to a side wall of the cover, as by a knot 26, although the cord may be attached to the combined cover and anchor in any suitable manner as will be obvious. The plate 3 may be provided with one or more upwardly extending portions 30, which frictionally engage the reel plate 16 and retard the unwinding of the reel so as to prevent racing.

When the device is all assembled, the cover will be locked upon the hub plate, as shown in Fig. 3, and it will be seen that the hub plate, reel with cord wound thereon, and combined cover and anchor constitute a unit which, because of its compactness, will occupy a very small space so that a number of these devices may be stored or transported in a relatively small container. In the use of the device, it is secured in the proper position to a decoy, first by temporarily attaching the hub plate by means of the spur 6, and finally by the screws 7 which pass through said plate and the decoy. The cover 10 will then be locked in position so that the line or cord is closed and the parts will remain in such positions until the decoy is used. Partial rotation of the cover 10 will cause its flanges to be unlocked and said cover will then be used as a weight, a suitable amount of cord being unwound from the reel, as desired.

It is to be observed that the reel, cord and combined cover plate and anchor, when the parts are assembled, constitute a very compact unit, with the winding means for the cover plate or anchor concealed within the latter, which acts as a guard against blows and not only prevents injury to the reel, but protects the cord from becoming loosened and entangled. In decoy ducks, as is well known, the cord which extends from the decoy to the anchor is in practice wound about the decoy when the latter is removed from the water. This not only soils the hands, but in cold weather the necessary contact of the gunner's hands with the wet cord in winding it about the decoy is extremely disagreeable. By the use of the reel in the present invention the cord is preserved in condition to avoid becoming entangled, and at the same time it may be unwound from the reel when the decoy is set out or rewound thereon when the decoy is removed from the water with ease and facility, and without the disagreeable features which are incident to the use of the decoy with the ordinary cord extending directly from the bottom of the decoy to its anchor.

When used in muddy water, or where weeds and grass are thick, the cord frequently carries particles of mud and grass and by means of the device illustrated in Fig. 3ª the cord may be cleansed of extraneous matter as it is being wound upon the reel.

Referring to Fig. 3ª, one of the tongues 9, formed by bending back a portion of the flange 3, is provided with an upstanding projection 33, having a central hole 31, and two notches 32, which may be arranged on opposite sides of the hole. The cord 25 passes through the hole 31, and when a sufficient amount of the cord has been unwound from the reel, the cord may be wound around the slots 32 of the projection 33, and fastened by frictional engagement with said slots. The projection 33 may either be formed as a lateral extension of one of the tongues 9, or it may be independently struck up from the flange 3.

Instead of using a projection 30 with slots 32, to fasten off the cord, the latter may be passed beneath one of the tongues 9 and wound thereon when a sufficient amount of the cord has been unwound from the reel to extend the required distance from the decoy to the anchor weight.

Having thus described my invention, what I claim and desire to secure by Letters Patent is:

1. In a device of the class described, the combination with a reel adapted to be secured beneath a decoy and to contain the cord extending from said decoy, of a cover to surround said reel, said cord being attached to said cover whereby the latter may serve as an anchor.

2. In a device of the class described, the combination with a reel, of a cord wound thereon, a cover constructed to surround the reel and adapted for connection with said cord, and means for detachably securing said cover over the reel.

3. In a device of the class described, the combination of a plate adapted for attachment to a decoy, a reel mounted on said plate, a cover for said reel adapted to be connected to the cord carried by said reel, and means to detachably fasten said cover and plate together.

4. In a device of the class described, the combination with a plate having means for temporarily attaching it to a decoy, a reel rotatably mounted on said plate and carrying a cord, a combined enclosure and anchoring device adapted for detachable engagement with said plate to act as a protector for the reel and cord, and means affording connection between said cord and cover.

5. In a device of the class described, the combination of a plate having means for attachment to a decoy and a hub projecting from said plate, a reel comprising two plate members with inwardly extending hollow hubs, one of said hubs arranged to fit over the hub of said first-named plate, pivotal means securing the members of said reel to said hub, a cord wound upon said reel, a cover for enclosing said reel and cord, and arranged for connection with said cord, said cover having an outstanding flange, and interlocking means between said plate and flange.

6. In a device of the class described, the combination of a plate provided with a projecting hub and means for attaching said plate to a decoy, a tongue projecting upwardly from said plate and provided with an extension having an aperture therein, and a reel rotatably mounted on said plate and carrying an anchor cord adapted to pass through said aperture.

7. In a device of the class described, the combination of a plate having means for temporary attachment to a decoy, a hub projecting from said plate, a reel rotating on said hub and carrying a cord, and a combined cover and weight for said reel, said parts constituting a decoy balance weight and being adapted to be experimentally fastened to a decoy in order to locate their proper position thereon, and means for permanently securing the device to the decoy when such position has been determined.

In testimony whereof I have hereunto set my hand this 10th day of October, A. D. 1922.

LE ROY B. FRASER.